July 12, 1927.
H. W. MARCY
1,635,629
LINE DISTRIBUTOR FOR FISHING REELS
Filed Nov. 20, 1925
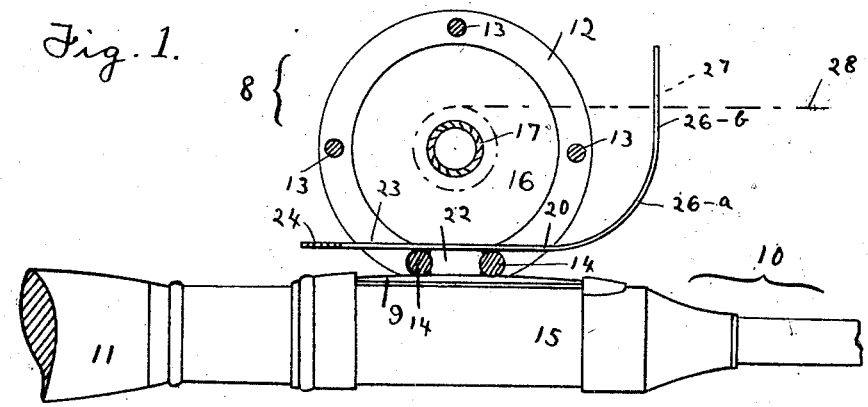
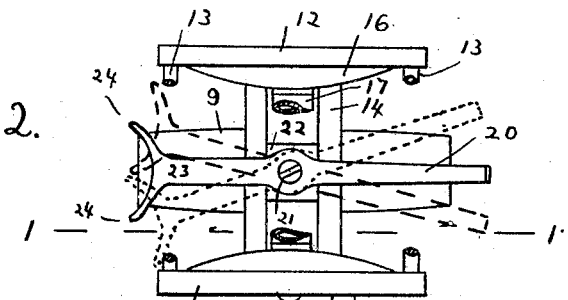
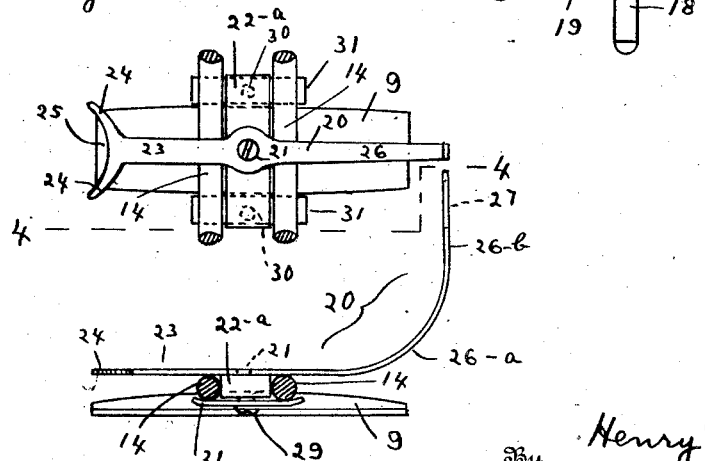
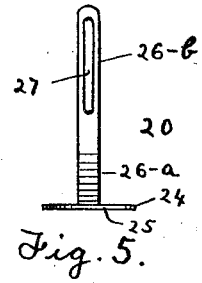
Inventor
Henry W. Marcy
By Martin & Rendell
Attorneys Patented July 12, 1927.

1,635,629

UNITED STATES PATENT OFFICE.

HENRY W. MARCY, OF UTICA, NEW YORK.

LINE DISTRIBUTOR FOR FISHING REELS.

Application filed November 20, 1925. Serial No. 70,263.

My present invention relates to a line distributor for fishing reels.

The purpose of my invention is to provide a device of the character described which is very simple and economical in construction, readily adapted to be applied to most types of fishing reels and which is capable of being readily and conveniently operated so as to wind the line regularly and level upon the fishing reel.

A further purpose of my invention is to provide a line distributor which is manually operated and which consists simply of a single light lever pivoted intermediate its ends upon the base of the fishing reel with the end of said lever extending to the rear of the reel far enough to be conveniently manipulated by the thumb of the fisherman and with the forward portion of the lever extending clear of the reel and then bent upward and provided near its end with a slot or elongated eye to receive and guide the fishing line so that a back and forth movement given to the rear end of the lever by the thumb guides the incoming line evenly across the reel and so forms what may be fairly termed a level winder.

A still further purpose is to provide a simple distributor of the type shown with its forward portion a little heavier than the rear portion so that under many circumstances the guiding end of the lever may be swung back and forth by a simple swaying motion of the rod and reel without the rear end of the distributing lever being positively manipulated by the hand of the fisherman.

Further purposes and advantages of my invention will appear from the specification and claim herein.

Fig. 1 is a side elevation of a line distributor embodying my invention as mounted upon a fishing reel and rod, the reel being shown in vertical section as upon line 1—1 of Fig. 2.

Fig. 2 is a top view of the said fishing reel and line distributor with the central portion of the shaft and upper bracing spindles of the reel broken away in order to more clearly show the various positions of the line distributor.

Fig. 3 is a top view of the distributor showing a modified form of base block therefor adapted to be detachably secured to the base of a reel, only the central portions of the lower spindles of the reel being shown.

Fig. 4 is a side elevation of the construction shown in Fig. 3.

Fig. 5 is a front view of the line distributor.

Referring to the drawings in a more particular description it will be seen that my line distributor is shown as applied to an ordinary type of fishing reel 8 which has its base plate 9 detachably secured in a common manner to the fishing rod 10 just forward of the handle 11. The reel 8 is of the common type wherein the side plates 12 have several upper bracing spindles 13 and two lower bracing spindles 14 which lower bracing spindles are in turn fastened to the base plate 9 of the reel which rests upon the reel-receiving portion 15 of the fishing rod. In this reel is mounted the usual rotating spool consisting of ends 16 partly housed in said plates 12 and connected by the shaft 17. The spool is rotated directly or through a train of gears, not shown, by rotation of the handle 18 on crank arm 19.

The line distributor itself consists of a lever 20 pivotally mounted intermediate its ends by means of a screw 21 extending through a suitable hole provided in the lever into a block 22 mounted centrally of the width of the reel as close to the base plate 9 of the reel as the lower bracing spindles 14 admit. In the form of my invention shown in Figs. 1 and 2 this block 22 is permanently secured to the base plate 9 of the reel and to the lower cross spindles 14 by any suitable means such as brazing.

The rearward portion 23 of lever 20 extends rearwardly clearing the rearward lower bracing spindle 14 and extends therebeyond a short distance and at its rear extremity is provided with oppositely extending ears 24 forming a wide shallow recess 25 adapted to fit the end of the operator's thumb and be swung back and forth laterally of the fishing reel by slight motion of the thumb. It will be understood that this rearward portion 23 of the lever extends rearwardly about parallel with the axial line of the fishing rod.

The forward portion 26 of lever 20 extends forwardly over and just clear of the forward bracing spindle 14 and then far enough thereafter to about be on a line with the forward spindle 13 of the reel. From this point the lever is bent upwardly preferably with the curved portion 26$^a$ and then extends straight upward forming an extremity 26ᵇ substantially at right angles with the length of the fishing rod. In this upright portion 26ᵇ there is provided an elongated eye 27 through which the fishing line 28 is led on its way from the pole to the reel.

It will now be seen that with the fishing rod held with the operator's hand upon the handle 11 the thumb of this hand will be in position to conveniently manipulate the forked rear end of the lever 20 and by slow back and forth movement direct the forward end of the lever back and forth across the front of the reel and so guide the line evenly back and forth across the reel as needed to spool the line evenly and closely upon the reel.

Preferably the forward portion of the distributor lever 20 will outweigh slightly the rear portion so that the line distributor may be manipulated without the thumb engaging the lever but simply by swaying the rod and therewith the reel back and forth as with a rolling or swaying motion. Such motion will carry the heavier forward end of the lever back and forth in front of the reel.

In Figs. 3 and 4, I have shown a modified form of my invention in that the distributor is made so as to be readily attached to or removed from an ordinary fishing reel. In this form of my invention the block 22ᵃ to which the lever is pivoted extends longitudinally past the opposite sides of the base plate 9. To the lower surface of these extended ends of block 22ᵃ are removably secured two clips 31 as by means of headed screws 29 extending through said clips and screw-threaded into holes 30 in the block 22ᵃ.

Where crossed by these clips the block 22ᵃ is of less thickness than the lower spacing spindles 14 so that the lower side of said block engages the top of the base plate 9 before the opposing faces of said block and clips meet with the result that said block is firmly but detachably secured in place between the lower spindles 14 and above the base plate 9. This detachable form of line distributor may be readily removed from the fishing reel by first removing the reel from the rod and then removing the screws 29.

It will be understood that in any form of my invention the lever 20 will be as thin as possible and mounted as close as possible to the lower spindles 14 so as not to interfere with the winding of a full line upon the reel.

In Fig. 2 the distributor lever 20 is shown in full lines in a position parallel with the fishing rod. In dotted lines there is shown the position of this lever when its rear end has been moved to the right which would obviously carry its forward end to the left. In dash lines is shown the other position of the lever namely with its rear end moved to the left which obviously carries its forward end to the right.

What I claim as new and desire to secure by Letters Patent is:

In combination a fishing reel having a base plate, spaced side plates and two lower spaced bracing spindles connecting the side plates and the base plate and a line distributor attachably and detachably connected to said reel and consisting of a block between said spindles and extending beyond the sides of said base plate, clips detachably secured to the extended ends of said blocks and engaging the lower side of said spindles and a lever pivoted intermediate its ends on the upper side of said block with its rear end adapted to be manually swung laterally of the reel and with its front end extending up in front of the reel and provided with an eye for guiding the line.

In witness whereof I have affixed my signature this 9th day of November, 1925.

HENRY W. MARCY.